(12) United States Patent
Zouhar et al.

(10) Patent No.: US 8,380,644 B2
(45) Date of Patent: Feb. 19, 2013

(54) SYSTEM AND METHOD FOR PROTOTYPING BY LEARNING FROM EXAMPLES WHEREIN A PROTOTYPE IS CALCULATED FOR EACH SHAPE CLASS CLUSTER

(75) Inventors: Alexander Zouhar, Lawrenceville, NJ (US); Sajjad Hussain Baloch, Monmouth Junction, NJ (US); Sergei Azernikov, Plainsboro, NJ (US); Claus Bahlmann, Princeton, NJ (US); Tong Fang, Morganville, NJ (US); Gozde Unal, Rockville, MD (US); Siegfried Fuchs, Dresden (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 582 days.

(21) Appl. No.: 12/702,362

(22) Filed: Feb. 9, 2010

(65) Prior Publication Data

US 2010/0217417 A1    Aug. 26, 2010

Related U.S. Application Data

(60) Provisional application No. 61/151,206, filed on Feb. 10, 2009.

(51) Int. Cl.
*G06F 15/18* (2006.01)
(52) U.S. Cl. ............................................. 706/12
(58) Field of Classification Search ............... 706/12, 706/45, 62
See application file for complete search history.

(56) References Cited

U.S. PATENT DOCUMENTS

| | | | | |
|---|---|---|---|---|
| 5,988,862 | A * | 11/1999 | Kacyra et al. | 703/6 |
| 8,250,004 | B2 * | 8/2012 | Angelov | 706/12 |
| 2004/0249809 | A1 * | 12/2004 | Ramani et al. | 707/4 |
| 2010/0036780 | A1 * | 2/2010 | Angelov | 706/12 |

* cited by examiner

*Primary Examiner* — David Vincent
(74) *Attorney, Agent, or Firm* — Donald B. Paschburg; F. Chau & Associates, LLC

(57) ABSTRACT

A method for specifying design rules for a manufacturing process includes providing a training set of 3D point meshes that represent an anatomical structure, for each 3D point mesh, finding groupings of points that define clusters for each shape class of the anatomical structure, calculating a prototype for each shape class cluster, and associating one or more manufacturing design rules with each shape class prototype. The method includes providing a new 3D point mesh that represents an anatomical structure, calculating a correspondence function that maps the new 3D point mesh to a candidate shape class prototype by minimizing a cost function, calculating a transformation that aligns points in the new 3D point mesh with points in the candidate shape class prototype, and using the rules associated with the shape class prototype, if the candidate shape class prototype is successfully aligned with the new 3D point mesh.

26 Claims, 8 Drawing Sheets

To FIG. 2B

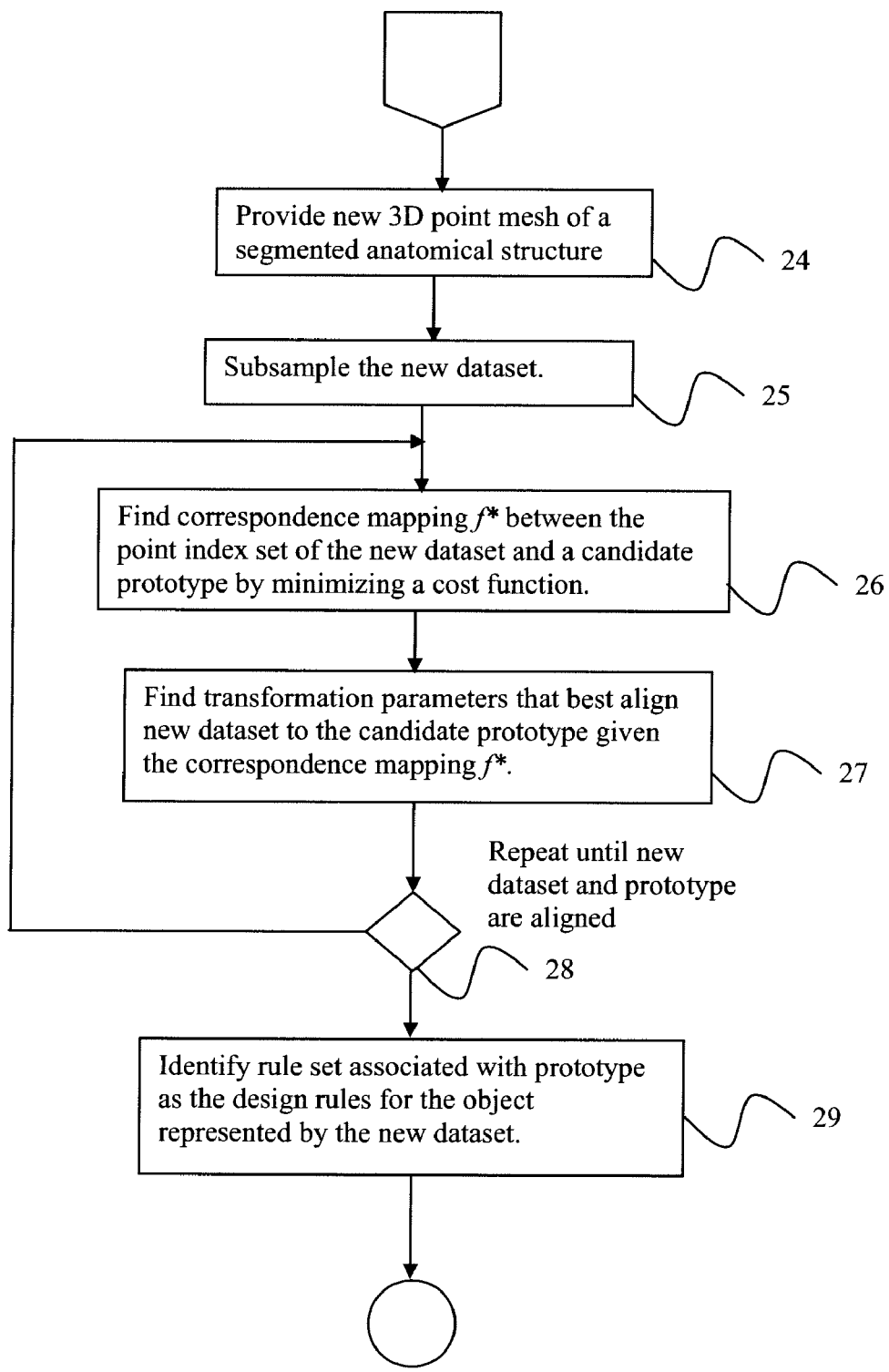

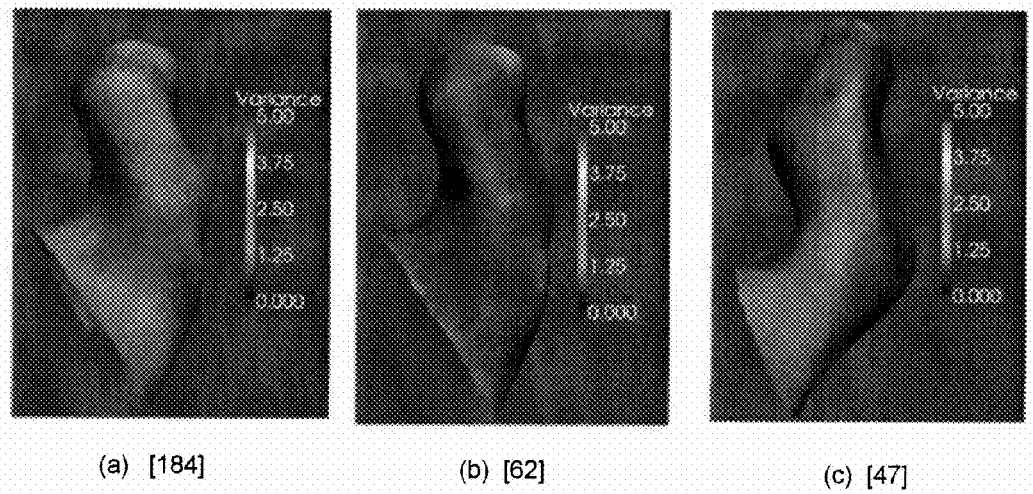
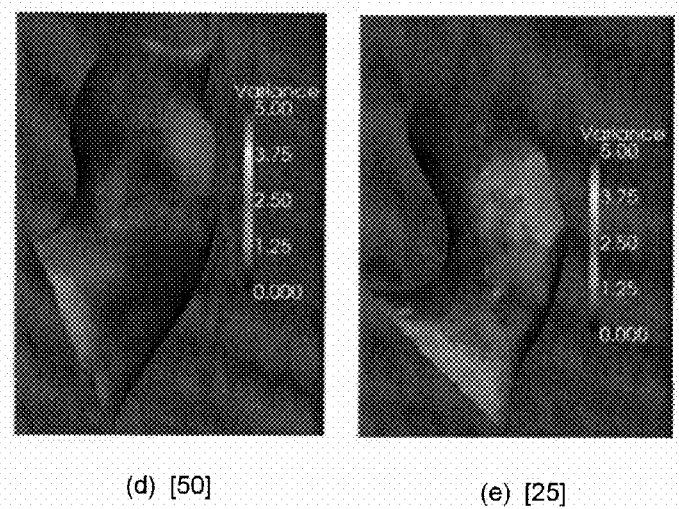
(a) [184]     (b) [62]     (c) [47]
(d) [50]     (e) [25]
Fig. 4

(a) [184]  (b) [85]
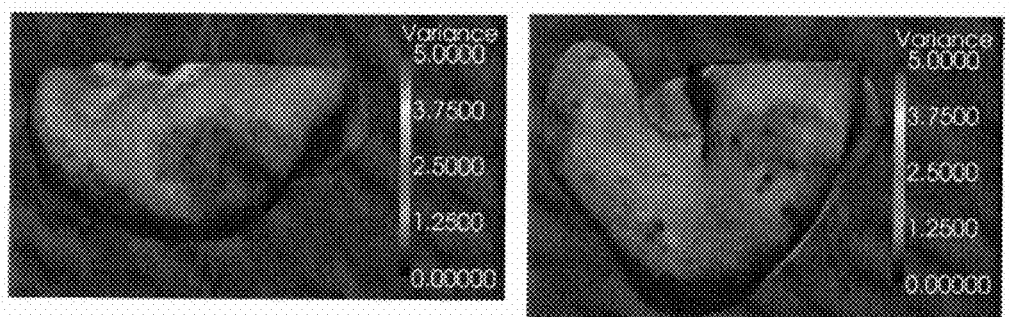
(c) [17]  (d) [24]
(e) [32]  (f) [26]
Fig. 5

Fig. 6 (a) (b) (c) (d)

SYSTEM AND METHOD FOR PROTOTYPING BY LEARNING FROM EXAMPLES WHEREIN A PROTOTYPE IS CALCULATED FOR EACH SHAPE CLASS CLUSTER

CROSS REFERENCE TO RELATED UNITED STATES APPLICATIONS

This application claims priority from "Prototyping By Learning From Examples", U.S. Provisional Application No. 61/151,206 of Zoubar, et al., filed Feb. 10, 2009, the contents of which are herein incorporated by reference in their entirety.

TECHNICAL FIELD

This disclosure is directed to methods for specifying rules for automatic digital anatomical shape design.

DISCUSSION OF THE RELATED ART

Automation is a step for increasing the performance of digital manufacturing systems that customize the shapes of implants and prosthetic devices to the anatomy of a patient. The challenge, however, lies in the ability of an automatic solution to adapt to anatomical variations of a given category of objects. Variations among different realizations of an anatomical shape is one of the major challenges that complicate digital design of anatomical shapes, such as hearing aids, implants, and prosthetic devices. This is a reason why anatomical shapes are normally custom designed, requiring the skills of experienced technicians. However, the reliance upon on human abilities raises quality issues. The variability of anatomical shapes, inadequacies of technicians, lack of repeatability, and lower efficiency all contribute to increasing manufacturing and healthcare costs. For example, in the digital design of hearing aids, these issues result in high recall rates, forcing manufacturers to expend resources on remakes. The gap between the personalized design and efficiency improvements may be bridged through automated processing, which aims at defining a small number of prototypical strategies that yield the customized end product. Prototypical strategies are derived from a set of design rules together with the characteristic shape information. A design rule then dictates how a shape undergoes modification, and may be a parameter, a work instruction, an operation, or a combination thereof. The task is then to effectively devise a design strategy that yields an anatomical shape in a desirable form. For a particular application, design strategies are devised by process engineers in the form of workflows, which are then executed manually by technicians.

One recently proposed fully automatic approach for hearing aid manufacturing models the relationship between two classes of input and output shapes as a mapping based on multivariate linear regression, where principal component analysis (PCA) was used to capture variation across samples. Given a shape from one class, the system automatically generates (predicts) the corresponding shape of the second class. This approach may be interpreted as a realization of a hierarchical schema.

SUMMARY OF THE INVENTION

Exemplary embodiments of the invention as described herein generally include methods and systems for a novel hierarchical framework that generalizes a digital design procedure in terms of a small number of prototypical strategies. By considering 3D objects as a decomposition of parts, they can be decomposed according to a pending design procedure. Subsequently, a learning phase clusters a representative training set of each part into a small number of classes according to a certain shape dissimilarity measure. This allows compact representation of the shape information of recognized classes through a code-book of prototypical parts. Prototypical design strategies are eventually obtained by combining the learned shape information given in the form of part prototypes, with the design rules specified by a process engineer. This correlates behavior between shape information of relevant parts with associated design rules, which is potentially well suited for inferences on novel samples. Consequently, automatic customized design reduces to (1) a nearest neighbor search for the best strategy in a small set of prototypical strategies, and (2) a mechanism that automatically performs the optimal strategy. The hierarchical structure allows more control over shape modification operations in terms of their local or global nature. The execution of optimal strategies results in the desired end product. The generalization capability of an approach according to an embodiment of the invention is demonstrated through application to typical hearing aid design operations, where the robustness was quantified in terms of a baseline criterion provided by experts.

According to an aspect of the invention, there is provided a method for automatically specifying design rules for a digitally controlled manufacturing process, including providing a training set of 3D point meshes that digitally represent an anatomical structure, where each mesh comprises a set of 3D points with an associated intensity value, for each 3D point mesh, finding groupings of the points that define clusters for each shape class of a plurality of classes that define the anatomical structure, calculating a prototype for each shape class cluster, and associating one or more design rules with each shape class prototype, where the design rules specify a design strategy for an object that fits the anatomical structure.

According to a further aspect of the invention, the 3D point meshes have been triangulated.

According to a further aspect of the invention, the 3D point meshes have been segmented.

According to a further aspect of the invention, calculating a prototype for each shape class cluster comprises calculating a mean cluster over all 3D point meshes in the training set.

According to a further aspect of the invention, finding a grouping of points that defines a cluster comprises repeating the steps of calculating a similarity function $s(i,j)$ of each pair of points $i,j$ in a 3D point mesh, calculating a function $r(i,j)$ as $s(i,j)-\max(a(i,k)+s(i,k))$ for $k \neq j$, where $a(i,k)$ is a function that is initialized to 0, updating function $a(i,j)$ as $\min\{0,r(j,j)+\Sigma\max\{0,r(k,j)\}\}$ for $i \neq j$ and as $\Sigma\max\{0,r(k,j)\}$ for $i=j$, where $k \neq i,j$, and summing $a(i,j)$ and $r(i,j)$, until a point $j$ is found that maximizes the sum $a(i,j)$ and $r(i,j)$ for a point $i$, where the set of points $i$ for which the sum $a(i,j)$ and $r(i,j)$ is a maximum forms a cluster about point $j$.

According to a further aspect of the invention, the similarity function $s(i,j)$ is a distance between points $i$ and $j$.

According to a further aspect of the invention, the method includes providing a new 3D point mesh that digitally represents an anatomical structure, where the mesh comprises a set of 3D points, each point having an associated intensity value, calculating a correspondence function that maps domain points in the new 3D point mesh to domain points in a candidate shape class prototype point set selected from the shape class prototypes by minimizing a cost function of points in the new 3D point mesh and the candidate shape class prototype point set, calculating a transformation that aligns points in the new 3D point mesh with points in the candidate shape class prototype point set based on the correspondence function between the corresponding domain points of the new 3D point mesh and the candidate shape class prototype point set, and identifying a set of one or more rules that specify a design strategy for an object that fits the anatomical structure as a rule set associated with the shape class prototype, if the candidate shape class prototype point set is successfully aligned with the new 3D point mesh.

According to a another aspect of the invention, there is provided a method for automatically specifying design rules for a digitally controlled manufacturing process, including providing a new 3D point mesh that digitally represents an anatomical structure, where the mesh comprises a set of 3D points, each point having an associated intensity value, providing a candidate shape class prototype point set that characterizes a shape of a part or all of the new 3D point mesh, where each point of the shape class prototype point set has an associated intensity value, calculating a correspondence function that maps domain points in the new 3D point mesh to domain points in the candidate shape class prototype point set by minimizing a cost function of points in the new 3D point mesh and the candidate shape class prototype point set, calculating a transformation that aligns points in the new 3D point mesh with points in the candidate shape class prototype point set based on the correspondence function between the corresponding domain points of the new 3D point mesh and the candidate shape class prototype point set, and for a candidate shape class prototype point set that is successfully aligned with the new 3D point mesh, identifying a rule set associated with the shape class prototype as a set of one or more rules that specify a design strategy for an object that fits the anatomical structure.

According to a further aspect of the invention, the method includes sampling a subset of points from the new 3D point mesh by embedding the mesh in a 3D cube, and selecting a subset of points that maximizes $$H\left(\frac{x - u_i}{h}\right)$$

over all non-empty sampling bins i where H( ) is a multivariate normal kernel of bandwidth h, x is a point is the new 3D point mesh, and $u_i$ is a center point of bin i.

According to a further aspect of the invention, calculating a correspondence function comprises finding a one-to-one mapping f* between domain point set I of the new 3D point mesh P and domain point set J of the candidate shape class prototype point set P' that minimizes a sum of local cost functions $\Sigma q(p_i, p'_j)$, where $p_i \in P$, $p'_j \in P'$, j=f(i), q(,) is the local cost function, and the sum is over all points in I.

According to a further aspect of the invention, calculating a transformation comprises finding a transformation T that minimizes $$\frac{1}{M}\sum [p'_j - T(p_i)]^T W_i [p'_j - T(p_i)],$$

where the sum is over all matched point pairs, M is the number of point pairs, and $W_i$ is a weight matrix.

According to a further aspect of the invention, $W_i = w_i I$, where I is the identity matrix and $$w_i = \frac{1}{Z_i}\exp(-[q(p_i, p'_j) - q(p_i, p'_k)]^2)$$

where $p_k \in P'$ and $Z_i$ is an integration constant.

According to a further aspect of the invention, the method includes calculating the candidate shape class prototype point set by providing a training set of 3D point meshes that digitally represent the anatomical structure, for each 3D point mesh, finding groupings of the points that define clusters for the shape class that defines the anatomical structure, and calculating a prototype for the shape class cluster from the cluster for each point set in the training set.

According to a another aspect of the invention, there is provided a program storage device readable by a computer, tangibly embodying a program of instructions executable by the computer to perform the method steps for automatically specifying design rules for a digitally controlled manufacturing process.

BRIEF DESCRIPTION OF THE DRAWINGS

FIG. 2B is a flowchart of an algorithm for inferring design rules for an anatomical structure represented by a newly acquired dataset, according to an embodiment of the invention

FIGS. 4(a)-(e) illustrate the variance of local Euclidian distances between canal prototypes and their assigned samples, according to an embodiment of the invention.

FIGS. 5(a)-(f) depict top views of left sided external ear prototypes obtained by affinity propagation, according to an embodiment of the invention.

DETAILED DESCRIPTION OF EXEMPLARY EMBODIMENTS

Figure 1:
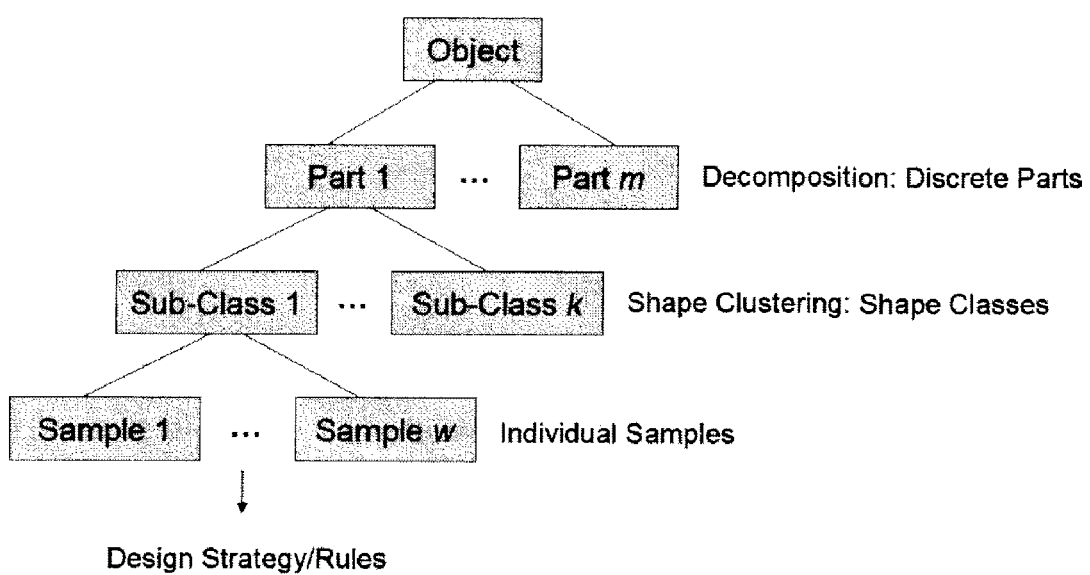
FIG. 1 illustrates how an object may be subdivided into a union of m discrete parts, according to an embodiment of the invention

Exemplary embodiments of the invention as described herein generally include systems and methods for generalizing a digital design procedure in terms of a small number of prototypical strategies. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An approach according to an embodiment of the invention develops a hierarchical framework that involves shape matching and clustering with the goal of finding the best strategy from amongst a finite set of prototypical strategies. As illustrated in FIG. 1, an object may be considered as a union of m discrete parts. Each of the m parts may be broken into k sub-classes, and sub-classes may be further broken down until one has w individual samples. This allows clustering of the objects of a given category into a small number of classes according to shape dissimilarities computed on the constituent discrete parts that are relevant for a pending design procedure. The variability within each sub-class is then compactly represented by a prototypical part exemplar as a representative prototype for all class members. The decomposition of objects into parts is a useful ingredient of the approach. It allows discarding of confounding influences from less relevant parts, and focusing on more pertinent regions. This allows more accurate inferences on design rules from the part prototypes to novel instances. For example, in the design of a tooth prosthesis, an informal rule "smooth sharp edges at the crown" will impose a spatial constraint on a smoothing operation, leaving out irrelevant parts out.

According to an embodiment of the invention, objects correspond to the members of an input shape class, with each being composed of a single part. Consequently, this forms a single cluster, which in turn is compactly represented by its mean shape, referred to as a prototype. Eventually, there exists one design rule given by a PCA based mapping, which models the process behavior. Thus, the entire design procedure is represented by a single strategy consisting of mean shape and regression based mapping. The granularity of the model may be increased at any level of the hierarchy, potentially benefiting performance. An approach according to an embodiment of the invention identifies the underlying categories of anatomical structures from a training set of samples and then interprets (labels) them in terms of design strategies. The number of design strategies is neither known nor fixed beforehand.

Methods

An algorithm according to an embodiment of the invention assumes that anatomical objects of a certain category are digitized by scanning the surfaces of physical representations. An acquired 3D point cloud is then triangulated to build a dense polygonal mesh surface that approximates a 2D manifold embedded in $R^3$. The following decomposition of a mesh surface into parts is process related and anatomically founded. It can be expressed in terms of a labeling function $v:R^3 \rightarrow \{1, \ldots, m\}$, which uniquely assigns a part label to each surface point. According to an embodiment of the invention, there are algorithms that automatically perform this labeling.

Given a training set of mesh models and their decomposition into m anatomical parts, a first step is to compactly represent the shape variability of the identified part categories. To that end, a clustering procedure may be used to find a (natural) grouping among parts of the same category according to their shape dissimilarities. Each shape cluster is then compactly represented by a member data sample, referred to as a prototype, that best characterizes all members in the cluster. Subsequently, the optimal design for the part prototypes is determined by a set of rules $\theta^l = \{\phi_1^l, \ldots, \phi_t^l\}$, $1 \leq l \leq m$. As mentioned earlier, such rules $\phi_i^l$, $1 \leq i \leq t$, describe the process behavior, for example, in the form of a parameter, a function, or a graph, etc. Together, a part prototype and its associated set its associated set of design rules form a strategy for a part l, where t denotes the maximal number of rules. The ensemble of rule sets $\theta^l(j_l)$, $1 \leq j_l \leq k_l$ comprises all possible part strategies, where $k_l$ denotes the number of recognized part classes. It is the task of a process engineer to associate each part prototype with its optimal set of design rules. Finally, the formal description of a digital shape design procedure reduces to a vector of part strategies, i.e. $\theta = (\theta^1(j_1), \ldots, \theta^m(j_m))$, $1 \leq j_l \leq k_l$.

The task for a novel sample X is to infer the optimal design procedure $\theta^*$ and then to devise a mechanism that performs it automatically. According to an embodiment of the invention, an optimal design strategy for each part is simply determined by the nearest candidate part prototype according to the chosen shape dissimilarity measure.

Shape Matching and Distance of Parts

According to an embodiment of the invention, a first step is to define a shape dissimilarity measure between equivalent anatomical parts $l \in \{1, \ldots, m\}$ of two segmented triangular meshes X,X'. A meaningful notion of shape dissimilarity is often coupled to the task of establishing correspondences between points of similar object parts. Shape dissimilarity can then be quantified as the cost of a geometric transformation that optimally aligns two point sets based on estimated correspondences. Preservation of the mesh topology can be quite challenging when the rigidity constraint is removed from the correspondence problem.

According to an embodiment of the invention, for simplicity, and tractability, points are sampled from a mesh with roughly uniform spacing, by embedding the mesh surface in a 3D cube, with orientation that is consistent with a unique relative object frame, obtained from PCA.

Sampling a point set $P_l \subset X$ of size $|P_l| \leq N$ from a mesh X with roughly uniform spacing between sampled points can be formulated as the optimal solution of the expression $$\max_{x \in X, v(x) = l} H\left(\frac{x - u_i}{h}\right), \forall i : bin(i) \neq 0, \quad (1)$$

where H(.) stands for a multivariate normal kernel of bandwidth h, centered at $u_i$, where $u_i$ denotes the center point of bin i. The sampling is constrained to non-empty grid cells i and equally labeled points, thus ensuring label consistency. The bandwidth h controls the sampling resolution. Normally, this approach will lead to unequal cardinality point sets, i.e. $|P_l| \approx |P'_l|, P'_l \subset X'$. In this setting, shape dissimilarity relates to a partial matching that optimally maps points in the lower cardinality set to some subset of the points in the larger set. In the subsequent discussion, we will omit the index l, and use the term shape distance instead of shape dissimilarity measure.

The shape distance should be symmetric, invariant to transformations natural to the task, and robust to certain non-ideal conditions, which may arise from noise in 3D scans and small local deformations. This suggests the use of rich local descriptors in order to hypothesize point correspondences. A point correspondence may be expressed as a one-to-one mapping $f:I \to J$ between sampled point sets $P \subset X$, $P' \subset X'$, where $I=\{i \in N: p_i \in P\}$ and $J=\{j \in N: p_j \in P'\}$ denote the index sets of P and P', respectively. Without loss of generality, it can be assumed that $|I| \leq |J|$.

The optimal correspondence mapping f* is subsequently obtained by minimizing an appropriate energy function, which is defined as a sum of local matching costs q(,), i.e.:

$$f^* = \mathrm{argmin} Q(f) = \mathrm{argmin} \sum_{i \in I} q(p_i, p'_{f(i)}). \quad (2)$$

As a solution, a 3D shape context framework can be used to find the optimal assignment f* subject to the constraint that the mapping is one-to-one. This requires a square cost matrix obtained by adding a constant high matching cost to the rows and/or columns.

Any measure of dissimilarity may be used as a cost function. An exemplary, non-limiting cost function q(,) is $$q(p_i, p'_j) = \frac{1}{2} \sum_{k=1}^{K} \frac{[h_i(k) - h_j(k)]^2}{h_i(k) + h_j(k)},$$

where $h_i(k)$ and $h_j(k)$ are relative coordinate histograms with K bins for $p_i$ and $p'_j$, respectively, where the histogram is defined by $h_i(k)=\#\{p_j \neq p_i:(p_j-p_i) \in \mathrm{bin}(k)\}$. Other exemplary cost functions include the Kullback-Leibler divergence, and a Euclidean distance.

Given the current best correspondence mapping f* between P and P', one may find the parameters of a transformation $T:R^3 \to R^3$ chosen from a suitable family, which, when applied to P, best aligns it with P' by minimizing $$E(T) = \frac{1}{M} \sum_{i \in I} [p'_j - T(p_i)]^T W_i [p'_j - T(p_i)], \quad (3)$$

where j=f*(i), and M is the number of participating point pairs. The weight matrix $W_i \in R^3 \times R^3$ encodes additional prior knowledge about each correspondence pair $(p_i, p'_j)$, in the form of a level of confidence. For example, for an isotropic case, $W_i$ reduces to $w_i I$.

In general, a suitable $w_i$ may readily be specified by noting that local mismatches between points $p_i \in P$ and $p'_j \in P'$ tend to increase the cost of their correspondence. For example, $$w_i = \frac{1}{Z_i} \exp(-[z_i - z_i^*]^2), \quad (4)$$

where $z_i = q(p_i, p'_j)$ denotes the local cost of matching $p_i$ and $p'_j$ according to f*, and $z_i^*$ indicates the actual minimal cost of matching $p_i$ to some point $p' \in P'$, which is not necessarily $p'_j \in P'$. $Z_i$ denotes the integration constant. Thus, the value of $w_i$ reduces the influence of locally unfavorable matches during the estimation of T.

The sequence of correspondence estimation and alignment may be reiterated in order to improve their combined performance. If T is an affine transformation, the eventual E(T) may be considered as shape distance between two equivalent object parts. If T is chosen to be nonlinear, a more suitable measure of shape distance is the "amount" of deformation needed to transform P to P'.

Shape Clustering and Prototype Selection

Consider the unsupervised grouping of n objects into k clusters according to the shape distances of the corresponding parts $i \in \{1, \ldots, m\}$. In general, the solution is obtained by minimizing an objective function that depends on n hidden labels corresponding to n objects, where each label $c_i \in \{1, \ldots, k\}$, $1 \leq i \leq n$ denotes the class association for each object.

Affinity propagation (AP) may be used to identify exemplars that best represent other cluster members. An affinity propagation algorithm takes general non-metric similarities as an input and determines the number of clusters depending on so-called (shared) input preferences, a weight that indicates how likely it is for each data point to be chosen as exemplar. Initially, all data pints are considered as potential exemplars. The AP algorithm then recursively exchanges real valued messages between data points until a high quality set of exemplars and corresponding clusters emerges. Compared to related techniques, AP is not susceptible to poor initializations and does not lead solutions that may result from hard decisions, for example by storing a relatively small number of estimated cluster centers at each step.

Specifically, AP takes as input a set of similarities s(i,j) between pairs of points i,j in a dataset, and iterates the following message functions: an "availability" function, a(i,j), which is initialized to 0, and a "responsibility" function r(i,k). An exemplary, non-limiting similarity function is a Euclidean distance: $s(i,j)=-|x_i-x_j|^2$, for points $x_i$ and $x_j$. The responsibility function is updated as $r(i,j) \leftarrow s(i,j) - \max\{a(i,k)+s(i,k)\}$, $k \neq j$, where the maximum is over all points k. The availability function is updated as $a(i,j) \leftarrow \min\{0, r(j, j+\Sigma \max\{0, r(k,j)\}\}$, $k \neq i,j$, where the sum is over all points k, for $i \neq j$, and as $a(i,i) \leftarrow \Sigma \max\{0, r(k,j)\}$ for i=j, where again the sum is over all points k. The sum is thresholded to be less than 0. After updating the availability and responsibility functions, the availability and responsibility functions are summed for each point i. For each point i, the value of k that maximizes a(i,k)+r(i,k) identifies i as a cluster center if k=i, or identifies point k as a cluster center for point i. The iterations may be terminated after a pre-determined number, or after changes in the message functions fall below a threshold, or after the number of identified clusters stays constant for some number of iterations. The message function updates may also be damped to avoid numerical oscillations: $f_{t+1}(i,j)=\lambda f_t(i,j)+(1-\lambda)f_{t+1}(i,j)$, where t is an iteration number.

When the number of clusters is not apparent from prior knowledge, AP can be executed several times with a shared preference value that relates to exactly k clusters. A standard approach for estimating the optimal number of clusters is to plot the percentage of variance explained by the clusters against the number of clusters ("elbow criterion"). The number of clusters is then chosen at the point, where the gain in information drops significantly. The resulting set of k exemplars may be used as prototypes.

Figure 2A:
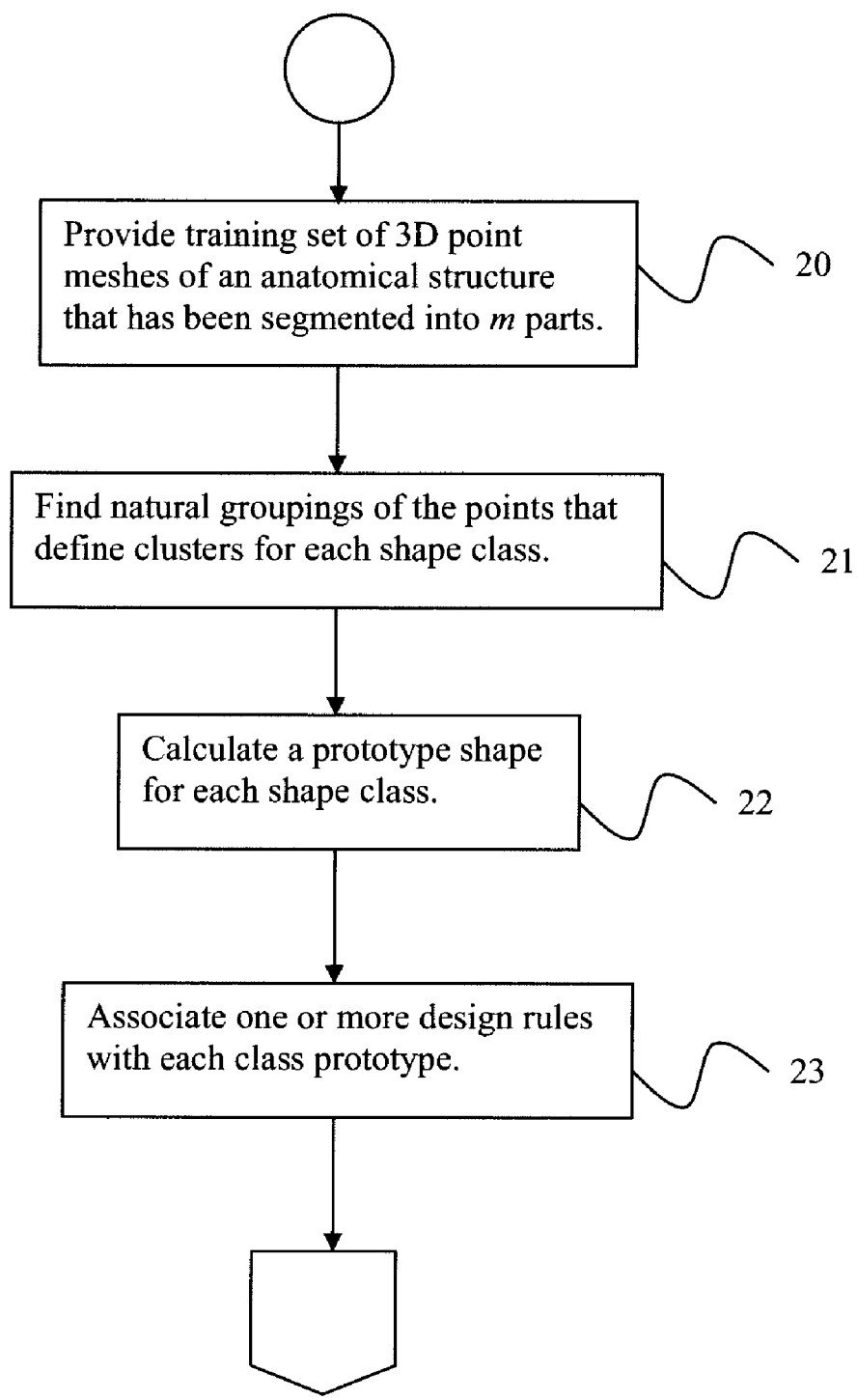
FIG. 2A is a flowchart of an algorithm for identifying prototypes and rules, according to an embodiment of the invention.

A flowchart of an algorithm according to an embodiment of the invention for identifying prototypes and rules is presented in FIG. 2A. Given a training set of triangulated 3D point sets that are digital representations of an anatomical structure that has been segmented into in parts, provided at step 20, an algorithm begins at step 21 by using affinity propagation on each part of each mesh to find natural groupings that define clusters for each shape class. Then, at step 22, each cluster can be represented by a prototype calculated from all clusters in the training set for each shape class. An exemplary, non-limiting prototype is the mean shape of the clusters in the training set for each shape class. Each prototype is associated with one or more design rules at step 23.

FIG. 2B is a flowchart of an algorithm according to an embodiment of the invention for inferring design rules for an anatomical structure represented by a newly acquired dataset. Given a new triangulated 3D point set P that digitally represents a anatomical structure that has been segmented into shape classes, provided at step 24, a first step in finding a prototype that matches the segmented part is to sample, at step 25, the new dataset based on EQ. (1). At step 26, a correspondence mapping f* is found by searching for a correspondence f between index set I of point set P and index set J of a candidate prototype point set P' that minimizes the cost function in EQ. (2). At step 27, the parameters of a transformation T that best aligns sets P to P' given the correspondence f* between point sets I and J is found by minimizing the energy function defined by EQ. (3). Steps 26 and 27 may be repeated from step 28 to improve alignment. It is possible that the candidate prototype cannot be aligned with the new dataset, in which case steps 26-28 are repeated for another prototype. Once a matching prototype P' has been found, the design rules associated with that prototype from step 23 in FIG. 2A, above, are then associated with the new point set P at step 29. These design rules specify a design strategy for an object that fits the anatomical structure represented by point set P.

Experimental Results

The generalization capability of technique according to an embodiment of the invention may be demonstrated by applying it to two typical operations of digital hearing aid (HA) design, (1) canal tip modification, and (2) helix modification. Both are described by an informal rule that requires a manual positioning of an intersection plane at each of two anatomical parts, (1) the canal part (l=1), and (2) the external ear part (l=2). Based on the planes, the parts are then modified independently by removing unused material from the surface. Consequently, the behavior of the design procedure is determined mainly by the plane parameters that implicitly define two planar contours on a surface. Manually locating the planes can be tedious and time-consuming. An approach according to an embodiment of the invention can automatically infer the optimal planar contours on a surface using a small set of prototypical strategies.

Figure 3:
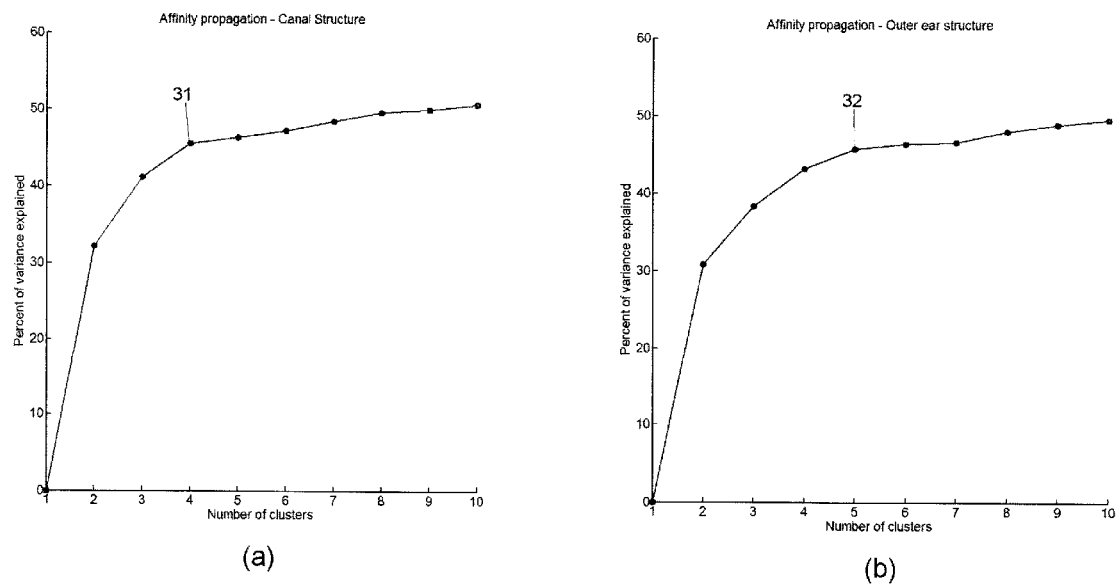
FIGS. 3(a)-(b) depict graphs of the percentage of variance as a function of the number of clusters, according to an embodiment of the invention.
Figure 6:
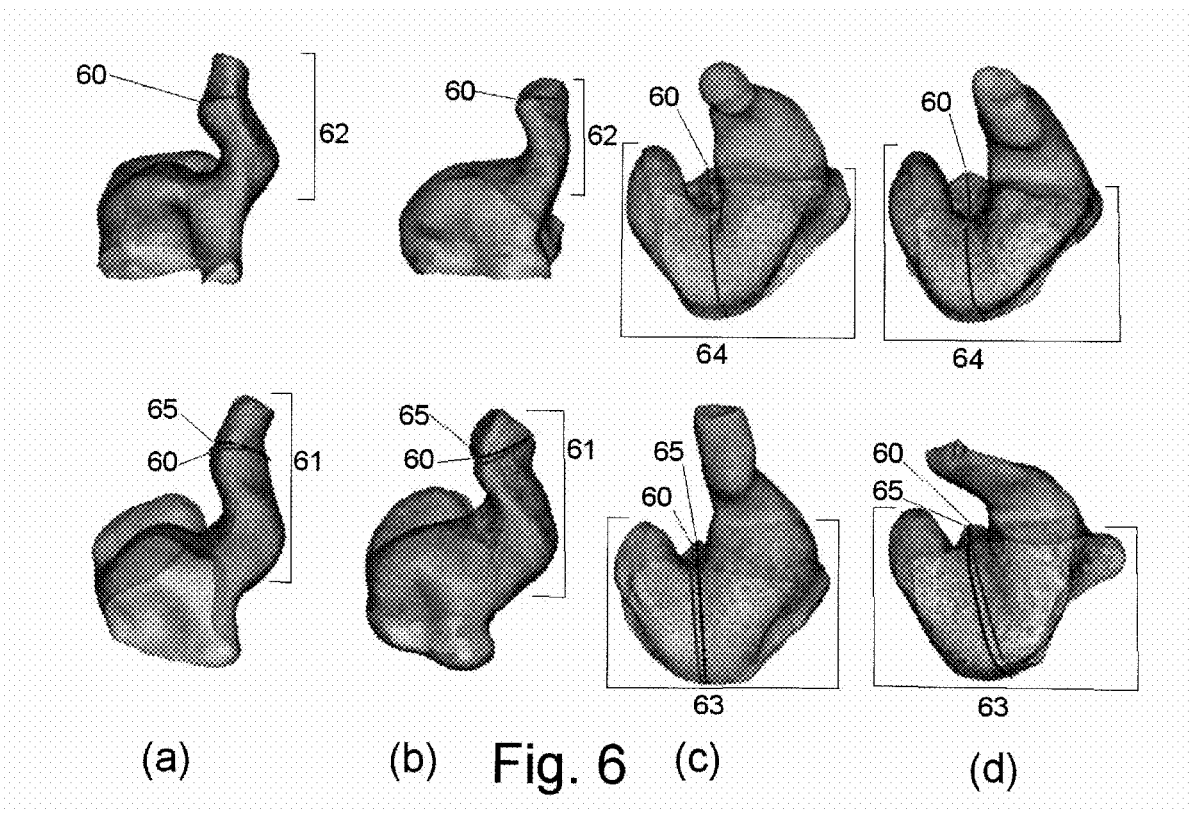
FIGS. 6(a)-(d) shows four inference examples of planar contours on four different novel test shapes, according to an embodiment of the invention.

A training set of 183 ear anatomy meshes was used, which were first segmented into a canal part and an external ear part. Due to the high mesh density (approximately 30,000 vertices), points were sampled from the mesh vertices of each part, as an approximate solution of EQ (1). Both structures (l=1) and (l=2) were sufficiently well represented by approximately 500 and 800 points, respectively. The symmetric matrix of pairwise distances $D_l$ was computed using an affine transformation model. $D_l$ was then passed to affinity propagation to generate $k_l$ clusters. The computation was limited to a maximum of $k_l$=10, since the marginal gain for adding new clusters/prototypes drops significantly after $k_1$=4 and $k_2$=5, which can be seen from the two "elbow" graphs in FIGS. 3(a)-(b). FIGS. 3(a)-(b) depict graphs of the percentage of variance as a function of the number of clusters, (a) for the training set of canal structures, and (b) the training set of external ear structures, with elbows 31 and 32, respectively. From the plots, one may conclude that the training set of canal structures is reasonably well represented by 4 clusters/prototypes, and the training set of external ear structures by 5 clusters/prototypes. All training samples were roughly evenly distributed among the clusters.

FIGS. 4(a)-(e) illustrate the variance of local Euclidian distances between canal prototypes and their assigned samples for $k_1$=1 and $k_1$=4. The figures depict side views of left sided canal prototypes obtained by affinity propagation, in which FIG. 4(a) uses one cluster, and FIGS. 4(b)-(e) use 4 clusters. Below each figure the number of assigned training samples is recorded. Besides the class specific anatomical characteristics captured by the prototypes, such as different degrees of canal bending, the coded variance reveals how compact the clusters are and to what extent certain local regions contribute to the distribution of variances over the surfaces. A comparison of FIG. 4(a) with FIGS. 4(b)-(e) shows that residual shape differences become increasingly localized at more structured regions, while at the same time the magnitude of variances decreases for the rest of the surface.

Similar observations can be made for the training set of external ear structures by comparing FIG. 5(a) with FIGS. 5(b)-(f). FIGS. 5(a)-(f) depict top views of left sided external ear prototypes obtained by affinity propagation, in which FIG. 5(a) uses one cluster, and FIG. 5(b)-(f) use 5 clusters. Below each figure the number of assigned training samples is shown. Here, the captured shape information comprises the appearance of helix and concha, as well as the transition area between the two, referred to as the crus ridge. In addition, in both cases, variations have been captured at subregions of the parts, where planar contours will eventually be placed (second bend, crus ridge). These variations indicate the existence of a correlated behavior between the accuracy of hypothesized contours and the shape information captured by the prototypes. The resulting small set of 9 part prototypes was sent to an expert, who conducted their annotation by manually positioning the optimal intersection planes. One rule is needed to describe a plane, i.e. $\theta_l = \{\phi_1^l\}$ where $\phi_1^l$: comprises the plane parameters (plane normal, plane location). The set of possible part strategies is given by the ensembles of rule sets $\theta^1(j_1)$ and $\theta^2(j_2)$, $1 \leq j_1 \leq 4$, $1 \leq j_2 \leq 5$.

FIGS. 6(a)-(d) shows four inference examples of planar contours on four different novel test shapes with columns (a) and (b) illustrating canal test cases, and columns (c) and (d) illustrating outer ear test cases. Each column depicts one test case, where the ground-truth planar contour 60 was mapped from the best part prototype 61, 63 of the first row to the test sample prototype 62, 64 in the second row, using the shape distance of EQ. (3), respectively. On each test sample the estimated (mapped) contour is indicated by 65 and the ground-truth contour is indicated by 60. The entire mesh surfaces are shown with shaded canal parts 61, 62 and outer ear parts 63, 64. Planar contours were then mapped from a part prototype to the test shape using the matching transformation T. The hypothesized contours are compared with a ground truth baseline given by a process engineer, which states that normal angle deviations of planar contours must stay within a tolerance range of 15 degrees, and plane location point coordinates, usually the center of a planar contour, should not deviate more than 3 mm from a given ground-truth position. For each test case, the estimated planar contour stays within the required tolerance ranges. Orientation/location deviations from the ground-truth are: (a) 8.5 degrees/0.2 mm; (b) 3.2 degrees/0.4 mm; (c) 3.1 degrees/0.8 mnl; (d) 6.3 degrees/0.7 mm. A technician may adjust or confirm the inferred contours. Subsequently, canal and outer ear parts are modified independently using design tools of the manufacturing software.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
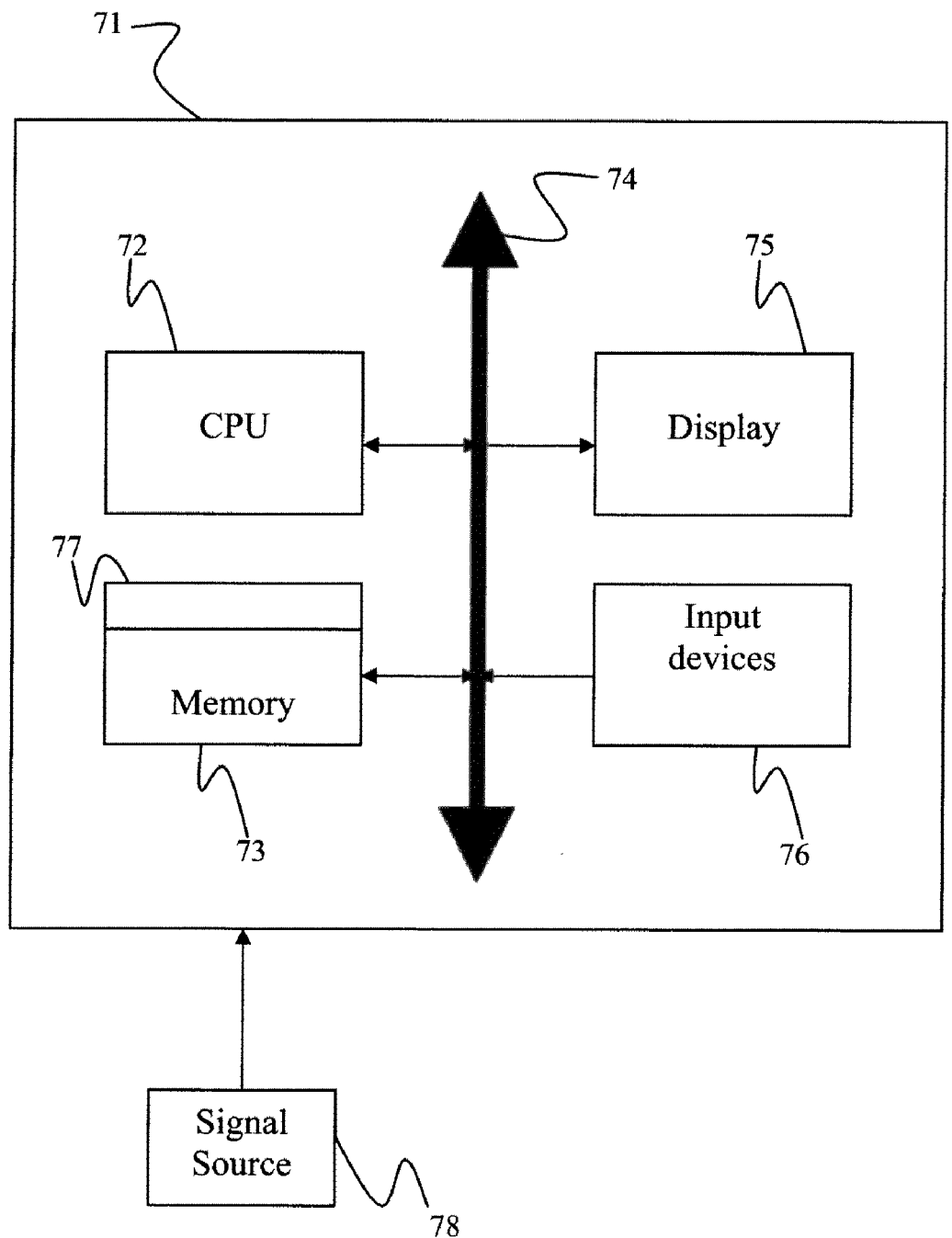
FIG. 7 is a block diagram of an exemplary computer system for implementing a method for generalizing a digital design procedure in terms of a small number of prototypical strategies, according to an embodiment of the invention.

FIG. 7 is a block diagram of an exemplary computer system for implementing a method for generalizing a digital design procedure in terms of a small number of prototypical strategies according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method of automatically specifying design rules for a digitally controlled manufacturing process, said method performed by the computer comprising the steps of:
    providing a training set of 3D point meshes that digitally represent an anatomical structure, wherein each mesh comprises a set of 3D points with an associated intensity value;
    for each 3D point mesh, finding groupings of the points that define clusters for each shape class of a plurality of classes that define said anatomical structure;
    calculating a prototype for each shape class cluster; and
    associating one or more design rules with each shape class prototype, wherein said design rules specify a design strategy for an object that fits said anatomical structure.

2. The method of claim 1, wherein said 3D point meshes have been triangulated.

3. The method of claim 1, wherein said 3D point meshes have been segmented.

4. The method of claim 1, wherein calculating a prototype for each shape class cluster comprises calculating a mean cluster over all 3D point meshes in said training set.

5. The method of claim 1, wherein finding a grouping of points that defines a cluster comprises repeating the steps of:
    calculating a similarity function s(i,j) of each pair of points i,j in a 3D point mesh;
    calculating a function r(i,j) as s(i,j)−max(a(i,k)+s(i,k)) for k≠j, where a(i,k) is a function that is initialized to 0;
    updating function a(i,j) as min{0,r(j,j)+Σmax{0,r(k,j)})} for i≠j and as Σmax{0,r(k,j)} for i=j, wherein k≠i,j; and
    summing a(i,j) and r(i,j), until a point j is found that maximizes the sum a(i,j) and r(i,j) for a point i, wherein the set of points i for which the sum a(i,j) and r(i,j) is a maximum forms a cluster about point j.

6. The method of claim 5, wherein said similarity function s(i,j) is a distance between points i and j.

7. The method of claim 1, further comprising:
    providing a new 3D point mesh that digitally represents an anatomical structure, wherein said mesh comprises a set of 3D points, each point having an associated intensity value;
    calculating a correspondence function that maps domain points in the new 3D point mesh to domain points in a candidate shape class prototype point set selected from said shape class prototypes by minimizing a cost function of points in the new 3D point mesh and the candidate shape class prototype point set;
    calculating a transformation that aligns points in the new 3D point mesh with points in the candidate shape class prototype point set based on the correspondence function between the corresponding domain points of the new 3D point mesh and the candidate shape class prototype point set; and
    identifying a set of one or more rules that specify a design strategy for an object to that fits said anatomical structure as a rule set associated with said shape class prototype, if said candidate shape class prototype point set is successfully aligned with said new 3D point mesh.

8. A computer implemented method of automatically specifying design rules for a digitally controlled manufacturing process, said method performed by the computer comprising the steps of:
    providing a new 3D point mesh that digitally represents an anatomical structure, wherein said mesh comprises a set of 3D points, each point having an associated intensity value;
    providing a candidate shape class prototype point set that characterizes a shape of a part or all of said new 3D point mesh, wherein each point of said shape class prototype point set has an associated intensity value;
    calculating a correspondence function that maps domain points in the new 3D point mesh to domain points in the candidate shape class prototype point set by minimizing a cost function of points in the new 3D point mesh and the candidate shape class prototype point set;

calculating a transformation that aligns points in the new 3D point mesh with points in the candidate shape class prototype point set based on the correspondence function between the corresponding domain points of the new 3D point mesh and the candidate shape class prototype point set; and for a candidate shape class prototype point set that is successfully aligned with said new 3D point mesh, identifying a rule set associated with said shape class prototype as a set of one or more rules that specify a design strategy for an object that fits said anatomical structure.

9. The method of claim 8, further comprising sampling a subset of points from said new 3D point mesh by embedding said mesh in a 3D cube, and selecting a subset of points that maximizes $$H\left(\frac{x-u_i}{h}\right)$$

over all non-empty sampling bins i wherein H( ) is a multivariate normal kernel of bandwidth h, x is a point is said new 3D point mesh, and $u_i$ is a center point of bin i.

10. The method of claim 8, wherein calculating a correspondence function comprises finding a one-to-one mapping f* between domain point set I of the new 3D point mesh P and domain point set J of the candidate shape class prototype point set P' that minimizes a sum of local cost functions $\Sigma q(p_i,p'_j)$, wherein $p_i \in P$, $p'_j \in P'$, j=f(i), q(,) is said local cost function, and the sum is over all points in I.

11. The method of claim 10, wherein calculating a transformation comprises finding a transformation T that minimizes $$\frac{1}{M}\sum [p'_j - T(p_i)]^T W_i [p'_j - T(p_i)],$$

wherein the sum is over all matched point pairs, M is the number of point pairs, and $W_i$ is a weight matrix.

12. The method of claim 11, wherein $W_i = w_i I$, wherein I is the identity matrix and $$w_i = \frac{1}{Z_i} \exp(-[q(p_i, p'_j) - q(p_i, p'_k)]^2)$$

wherein $p_k \in P'$ and $Z_i$ is an integration constant.

13. The method of claim 8, further comprising calculating said candidate shape class prototype point set by providing a training set of 3D point meshes that digitally represent said anatomical structure, for each 3D point mesh, finding groupings of the points that define clusters for the shape class that defines said anatomical structure, and calculating a prototype for said shape class cluster from the cluster for each point set in the training set.

14. A program storage device readable by a computer, tangibly embodying a program of instructions executable by the computer to perform the method steps for automatically specifying design rules for a digitally controlled manufacturing process, said method comprising the steps of:

providing a training set of 3D point meshes that digitally represent an anatomical structure, wherein each mesh comprises a set of 3D points with an associated intensity value;

for each 3D point mesh, finding groupings of the points that define clusters for each shape class of a plurality of classes that define said anatomical structure;

calculating a prototype for each shape class cluster; and associating one or more design rules with each shape class prototype, wherein said design rules specify a design strategy for an object that fits said anatomical structure.

15. The computer readable program storage device of claim 14, wherein said 3D point meshes have been triangulated.

16. The computer readable program storage device of claim 14, wherein said 3D point meshes have been segmented.

17. The computer readable program storage device of claim 14, wherein calculating a prototype for each shape class cluster comprises calculating a mean cluster over all 3D point meshes in said training set.

18. The computer readable program storage device of claim 14, wherein finding a grouping of points that defines a cluster comprises repeating the steps of:

calculating a similarity function s(i,j) of each pair of points i,j in a 3D point mesh;

calculating a function r(i,j) as s(i,j)−max(a(i,k)+s(i,k)) for k≠j, where a(i,k) is a function that is initialized to 0;

updating function a(i,j) as min{0,r(j,j)+Σmax{0,r(k,j)}} for i≠j and as Σmax{0,r(k,j)} for i=j, wherein k≠i,j; and summing a(i,j) and r(i,j), until a point j is found that maximizes the sum a(i,j) and r(i,j) for a point i, wherein the set of points i for which the sum a(i,j) and r(i,j) is a maximum forms a cluster about point j.

19. The computer readable program storage device of claim 18, wherein said similarity function s(i,j) is a distance between points i and j.

20. The computer readable program storage device of claim 14, the method further comprising:

providing a new 3D point mesh that digitally represents an anatomical structure, wherein said mesh comprises a set of 3D points, each point having an associated intensity value;

calculating a correspondence function that maps domain points in the new 3D point mesh to domain points in a candidate shape class prototype point set selected from said shape class prototypes by minimizing a cost function of points in the new 3D point mesh and the candidate shape class prototype point set;

calculating a transformation that aligns points in the new 3D point mesh with points in the candidate shape class prototype point set based on the correspondence function between the corresponding domain points of the new 3D point mesh and the candidate shape class prototype point set; and identifying a set of one or more rules that specify a design strategy for an object that fits said anatomical structure as a rule set associated with said shape class prototype, if said candidate shape class prototype point set is successfully aligned with said new 3D point mesh.

21. A program storage device readable by a computer, tangibly embodying a program of instructions executable by the computer to perform the method steps for automatically specifying design rules for a digitally controlled manufacturing process, said method comprising the steps of:

providing a new 3D point mesh that digitally represents an anatomical structure, wherein said mesh comprises a set of 3D points, each point having an associated intensity value;

providing a candidate shape class prototype point set that characterizes a shape of a part or all of said new 3D point mesh, wherein each point of said shape class prototype point set has an associated intensity value;

calculating a correspondence function that maps domain points in the new 3D point mesh to domain points in the candidate shape class prototype point set by minimizing a cost function of points in the new 3D point mesh and the candidate shape class prototype point set;

calculating a transformation that aligns points in the new 3D point mesh with points in the candidate shape class prototype point set based on the correspondence function between the corresponding domain points of the new 3D point mesh and the candidate shape class prototype point set; and for a candidate shape class prototype point set that is successfully aligned with said new 3D point mesh, identifying a rule set associated with said shape class prototype as a set of one or more rules that specify a design strategy for an object that fits said anatomical structure.

22. The computer readable program storage device of claim 21, the method further comprising sampling a subset of points from said new 3D point mesh by embedding said mesh in a 3D cube, and selecting a subset of points that maximizes $$H\left(\frac{x - u_i}{h}\right)$$

over all non-empty sampling bins i wherein H( ) is a multivariate normal kernel of bandwidth h, x is a point is said new 3D point mesh, and $u_i$ is a center point of bin i.

23. The computer readable program storage device of claim 21, wherein calculating a correspondence function comprises finding a one-to-one mapping f* between domain point set I of the new 3D point mesh P and domain point set J of the candidate shape class prototype point set P' that minimizes a sum of local cost functions $\Sigma q(p_i, p'_j)$, wherein $p_i \epsilon P$, $p'_j \epsilon P'$, j=f(i), q(,) is said local cost function, and the sum is over all points in I.

24. The computer readable program storage device of claim 23, wherein calculating a transformation comprises finding a transformation T that minimizes $$\frac{1}{M} \sum [p'_j - T(p_i)]^T W_i [p'_j - T(p_i)],$$

wherein the sum is over all matched point pairs, M is the number of point pairs, and $W_i$ is a weight matrix.

25. The computer readable program storage device of claim 24, wherein $W_i = w_i I$, wherein I is the identity matrix and $$w_i = \frac{1}{Z_i} \exp(-[q(p_i, p'_j) - q(p_i, p'_k)]^2)$$

wherein $p_k \epsilon P'$ and $Z_i$ is an integration constant.

26. The computer readable program storage device of claim 21, the method further comprising calculating said candidate shape class prototype point set by providing a training set of 3D point meshes that digitally represent said anatomical structure, for each 3D point mesh, finding groupings of the points that define clusters for the shape class that defines said anatomical structure, and calculating a prototype for said shape class cluster from the cluster for each point set in the training set.

* * * * *